(12) United States Patent
Tanaka et al.

(10) Patent No.: US 9,010,806 B2
(45) Date of Patent: Apr. 21, 2015

(54) STEERING SYSTEM

(71) Applicant: JTEKT Corporation, Osaka-shi, Osaka (JP)

(72) Inventors: Eiji Tanaka, Kitakatsuragi-gun (JP); Susumu Imagaki, Tondabayashi (JP); Hiroyuki Yao, Kashihara (JP); Takeshi Matsuda, Hamamatsu (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 14/280,228

(22) Filed: May 16, 2014

(65) Prior Publication Data

US 2014/0346760 A1    Nov. 27, 2014

(30) Foreign Application Priority Data

May 24, 2013    (JP) .................................. 2013-109660

(51) Int. Cl.
*B62D 1/19*    (2006.01)

(52) U.S. Cl.
CPC ...................................... *B62D 1/195* (2013.01)

(58) Field of Classification Search
CPC ........................................................ B62D 1/195
USPC .......................................................... 280/777
See application file for complete search history.

(56) References Cited

U.S. PATENT DOCUMENTS

| | | | |
|---|---|---|---|
| 4,022,495 A | 5/1977 | Pizzocri | |
| 8,585,089 B2 * | 11/2013 | Minamigata et al. | 280/777 |
| 2005/0200113 A1 * | 9/2005 | Cymbal et al. | 280/777 |
| 2012/0112443 A1 * | 5/2012 | Arakawa et al. | 280/777 |
| 2012/0169035 A1 * | 7/2012 | Minamigata et al. | 280/777 |
| 2012/0187669 A1 | 7/2012 | Minamigata et al. | |
| 2012/0267884 A1 * | 10/2012 | Fujiwara et al. | 280/777 |
| 2012/0291585 A1 * | 11/2012 | Minamigata et al. | 74/493 |
| 2012/0299281 A1 * | 11/2012 | Fujiwara et al. | 280/777 |
| 2012/0318092 A1 * | 12/2012 | Kuroumaru | 74/492 |
| 2013/0133460 A1 | 5/2013 | Uesaka | |
| 2014/0053677 A1 * | 2/2014 | Sakata | 74/493 |

FOREIGN PATENT DOCUMENTS

| | | |
|---|---|---|
| DE | 25 35 812 | 4/1976 |
| EP | 2 565 103 A1 | 3/2013 |
| EP | 2 599 685 A1 | 6/2013 |
| JP | A-2012-121538 | 6/2012 |
| WO | WO 2010/026552 A2 | 3/2010 |

OTHER PUBLICATIONS

Oct. 10, 2014 Search Report issued in European Application No. 14169107.1.

* cited by examiner

*Primary Examiner* — Drew Brown
(74) *Attorney, Agent, or Firm* — Oliff PLC

(57) ABSTRACT

In a steering system, a first through-hole is formed in a stationary bracket secured to vehicle body. A second through-hole is formed in a movable bracket that is movable relative to the stationary bracket in a prescribed direction at the time of a secondary collision. A pin passed through both the first through-hole and the second through-hole breaks at a position between the first through-hole and the second through-hole at the time of the secondary collision, thereby allowing the movable bracket to move relative to the stationary bracket. An under plate attached to the movable bracket closes the second through-hole from below.

5 Claims, 7 Drawing Sheets

STEERING SYSTEM

INCORPORATION BY REFERENCE

The disclosure of Japanese Patent Application No. 2013-109660 filed on May 24, 2013 including the specification, drawings and abstract is incorporated herein by reference in its entirety.

BACKGROUND OF THE INVENTION

1. Field of the Invention

The invention relates to a steering system.

2. Description of the Related Art

If a vehicle collides with an obstacle such as another vehicle, subsequent to a primary collision of the vehicle with the obstacle, a secondary collision of a driver with a steering wheel, which is a steering member, may occur. In order to absorb an impact caused by a secondary collision, there have been proposed various configurations for removing part of a steering column from a vehicle body to move the part of the steering column in the axial direction of a column shaft (toward the front of the vehicle body) in a steering system. For example, in a steering column supporting device described in Japanese Patent Application Publication No. 2012-121538 (JP 2012-121538 A), a pair of engagement cutouts extending parallel to the axial direction of a column shaft is formed in a vehicle body-side bracket secured to a vehicle body. One engagement capsule is fitted in each of the engagement cutouts, and each engagement capsule is positioned with respect to the vehicle body-side bracket with a plurality of engaging pins. A column-side bracket that holds a steering wheel is connected to the engagement capsules with bolts.

At the time of a secondary collision, the engaging pins break to remove the engagement capsules from the vehicle body-side bracket, so that the engagement capsules are moved along the engagement cutouts together with the column-side bracket. In this way, an impact caused by the secondary collision is absorbed.

In the steering column supporting device described in JP 2012-121538 A, fragments of the engaging pins that break at the time of the secondary collision may drop from the engagement capsules and the vehicle side bracket. If all the fragments of the engaging pins drop, it is not possible to find the fragments of the engaging pins after the secondary collision. Under such circumstances, it is not possible to clearly determine whether the engaging pins set in advance breaks properly at the time of the secondary collision to fulfill an impact absorbing function, or the engaging pins are actually not present from the beginning because the engagement pins are not set during assembly.

SUMMARY OF THE INVENTION

One object of the invention is to provide a steering system having a configuration that makes it possible to clearly determine whether pins break to satisfactorily fulfill an impact absorbing function at the time of a secondary collision.

A steering system according to an aspect of the invention includes: a stationary bracket having an elongated groove extending in a prescribed direction and a first through-hole, and secured to a vehicle body; a movable bracket having an insertion hole opposed to the elongated groove and a second through-hole, the movable bracket being movable relative to the stationary bracket in the prescribed direction together with a steering member at a time of a secondary collision; a suspending member passed through the elongated groove and the insertion hole that are opposed to each other to suspend the movable bracket from the stationary bracket, the suspending member being movable along the elongated groove together with the movable bracket at the time of the secondary collision; a pin that is passed through both the first through-hole and the second through-hole that are opposed to each other, and that breaks at a position between the first through-hole and the second through-hole that are offset from each other at the time of the secondary collision to allow the movable bracket to move relative to the stationary bracket in the prescribed direction; and an under plate attached to the movable bracket so as to close the second through-hole from below.

In the steering system according to the above aspect, the pin passed through both the first through-hole and the second through-hole breaks at the time of the secondary collision, thereby allowing the movable bracket to move relative to the stationary bracket. In this way, an impact caused by the secondary collision is absorbed. Even when the pin breaks into fragments at the time of the secondary collision, the fragment of the pin in the second through-hole is supported by the under plate from below and thus remains in the second through-hole without dropping from the second through-hole even after the secondary collision. Therefore, if the presence of the fragment of the pin in the second through-hole is confirmed, it is determined that the pin breaks properly at the time of the secondary collision, that is, the impact absorbing function of the steering system is fulfilled properly. On the other hand, if the fragment of the pin is not found in the second through-hole after the secondary collision, it is determined that a worker forgets to set the pin during the assembly of the steering system and therefore no pin is present in the steering system from the beginning.

By checking the presence or absence of the fragment of the pin in the second through-hole, it is possible to clearly determine whether the impact absorbing function of the steering system is properly fulfilled due to breakage of the pin at the time of the secondary collision. The movable bracket is reinforced by the under plate attached thereto, which makes it possible to enhance the stiffness of the movable bracket (in other words, the entirety of the steering system).

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
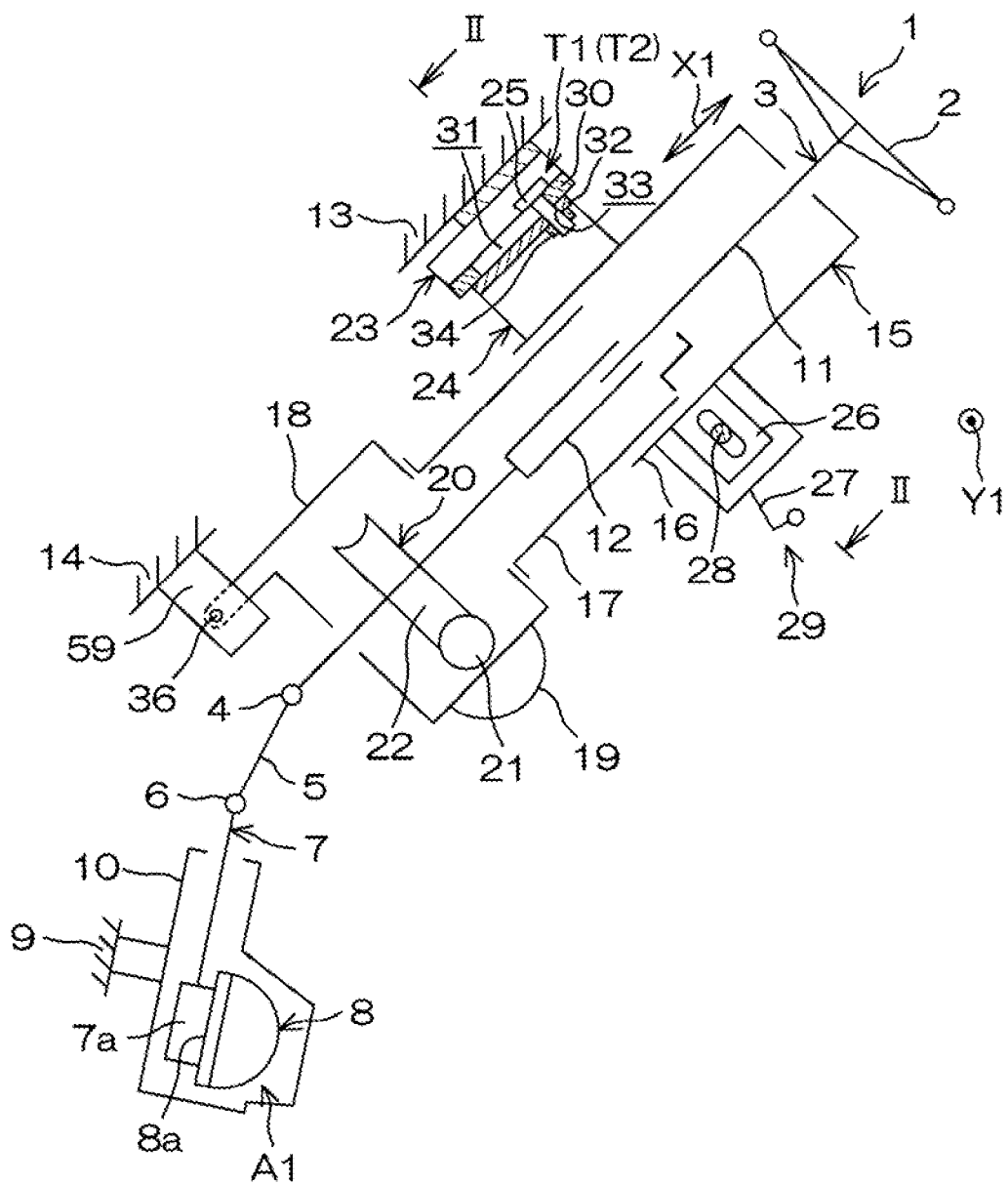
FIG. 1 is a schematic side view illustrating the schematic configuration of a steering system according to an embodiment of the invention.

Hereinafter, an embodiment of the invention will be described in detail with reference to the accompanying drawings. FIG. 1 is a schematic side view illustrating the schematic configuration of a steering system 1 according to the embodiment of the invention. The left side in FIG. 1 corresponds to the front side of the steering system 1 and the front side of a vehicle body, to which the steering system 1 is fitted, and the right side in FIG. 1 corresponds to the rear side of both the steering system 1 and the vehicle body. The upper side in FIG. 1 corresponds to the upper side of both the steering system 1 and the vehicle body, and the lower side in FIG. 1 corresponds to the lower side of both the steering system 1 and the vehicle body.

As illustrated in FIG. 1, the steering system 1 includes, as main components, a steering shaft 3 connected to a steering member 2, such as a steering wheel, and extending in the longitudinal direction of the vehicle body, an intermediate shaft 5 connected to the steering shaft 3 via a universal joint 4, a pinion shaft 7 connected to the intermediate shaft 5 via a universal joint 6, a rack shaft 8, and a steering column 15. A pinion 2a, which is disposed on the pinion shaft 7 at a position near an end portion of the pinion shaft 7, is meshed with a rack 8a of the rack shaft 8. A rack-and-pinion mechanism including the pinion shaft 7 and the rack shaft 8 constitutes a steering mechanism A1. The rack shaft 8 is supported by a housing 10 secured to a vehicle body-side member 9 (the vehicle body itself or a member secured to the vehicle body will be referred to as "vehicle body-side member"). The rack shaft 8 is movable in the vehicle-width direction that is the vehicle lateral direction (the direction perpendicular to the sheet on which FIG. 1 is drawn). Opposite end portions of the rack shaft 8 are respectively connected to steered wheels via tie rods (not illustrated) and knuckle arms (not illustrated).

The steering shaft 3 includes an upper shaft 11 and a lower shaft 12 that are, for example, spline-connected to each other so as to be rotatable together with each other and movable relative to each other in the axial direction. The steering shaft 3 is rotatably supported via bearings (not illustrated) by the steering column 15 secured to vehicle body-side members 13, 14. The steering column 15 includes a tubular upper jacket 16 and a tubular lower jacket 17 that are fitted to each other so as to be movable relative to each other in the axial direction (will be sometimes referred to as "prescribed direction X1") of the steering shaft 3, and a housing 18 connected to a lower axial end of the lower jacket 17. The upper jacket 16 is connected to the upper shaft 11 so as to be movable together with the upper shaft 11 in the prescribed direction X1. By moving the upper jacket 16 relative to the lower jacket 17 in the prescribed direction X1, the steering column 15 is subjected to telescopic adjustment.

The housing 18 accommodates a speed reducer 20 that reduces the speed of rotation output from an electric motor 19 for steering assist and transmits the rotation with a reduced speed to the lower shaft 12. The speed reducer 20 includes a drive gear 21 connected to a rotary shaft (not illustrated) of the electric motor 19 so as to be rotatable together with the rotary shaft, and a driven gear 22 that is meshed with the drive gear 21 so as to be rotated together with the lower shaft 12. By turning the steering member 2 to perform steering, the turning of the steering member 2 is transmitted to the steering shaft 3, the universal joint 4, the intermediate shaft 5, the universal joint 6 and the pinion shaft 7 in this order, and is converted into a linear motion of the rack shaft 8 in the vehicle-width direction. Thus, the steered wheels are steered. When necessary, the electric motor 19 is driven to assist the rotation of the steering shaft 3, so that a steering operation of the steering member 2 is assisted.

In the present embodiment, the steering system 1 according to the invention is an electric power steering system. However, the invention may be applied to a manual steering system that provides no steering assist using the electric motor 19. A lower bracket 59 secured to the vehicle body-side member 14 supports a tilt central shaft 36 that is a pivot shaft. The tilt central shaft 36 supports the entirety of the steering column 15 via the housing 18 for the steering column 15 such that the steering column 15 is pivotable about the tilt central shaft 36. By pivoting the steering column 15, the steering column 15 is subjected to tilt adjustment. Note that the invention may be applied not only to a steering system having both a telescopic adjustment function and a tilt adjustment function, but also to a steering system having one of the telescopic adjustment function and the tilt adjustment function.

Figure 2:
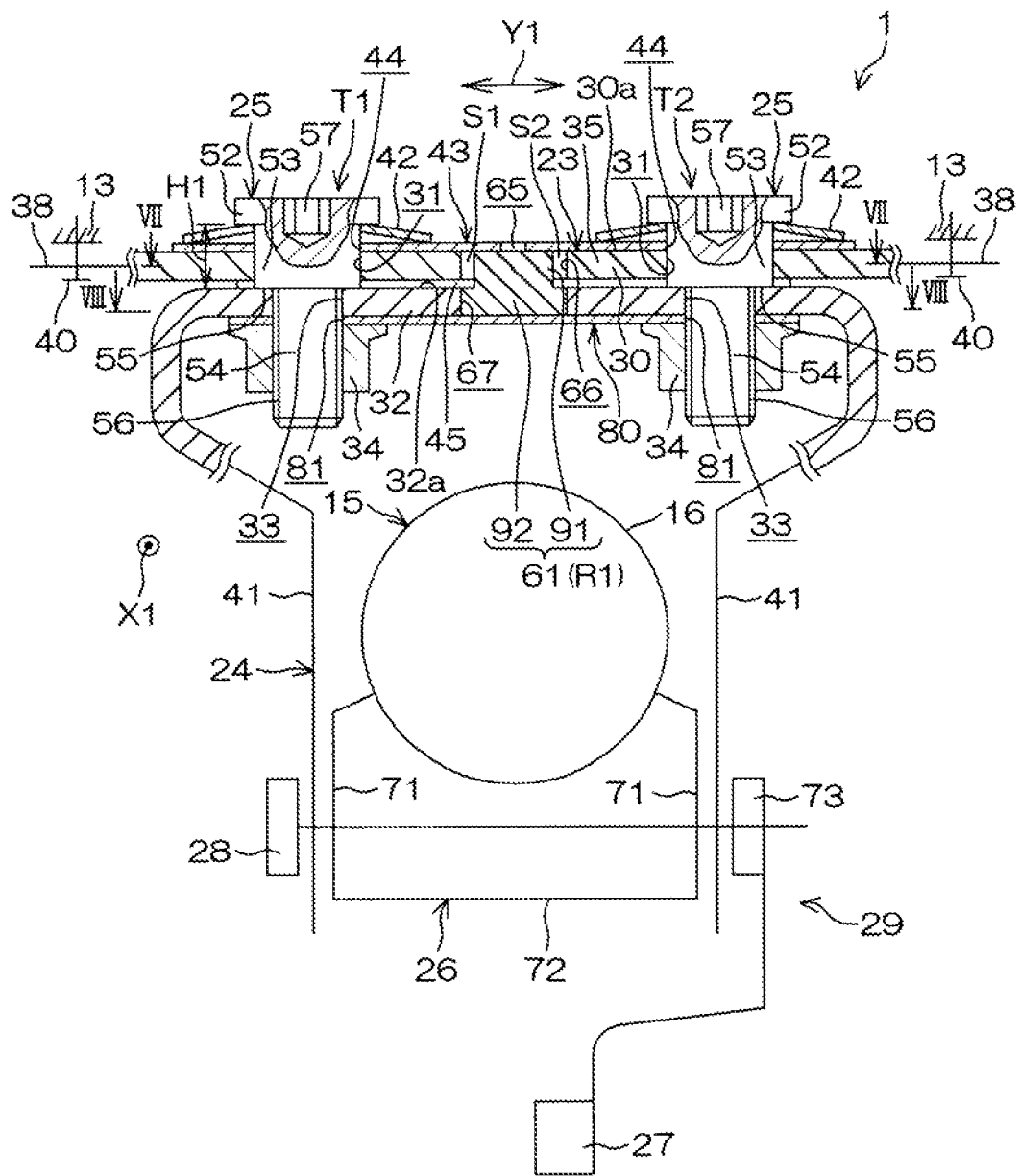
FIG. 2 is a sectional view schematically illustrating the steering system in FIG. 1, taken along the line II-II in FIG. 1.

The configuration of part of the steering system 1 near the vehicle body-side member 13 will be described below. The following description will be provided with the use of an orthogonal direction Y1 (which coincides with the vehicle-width direction as described above) that is orthogonal to the prescribed direction X1, in addition to the up-down direction and the prescribed direction X1 as described above. As illustrated in FIG. 2 that is a schematic sectional view, the steering system 1 further includes a stationary bracket 23 secured to the vehicle body-side member 13, a movable bracket 24 connected to the upper jacket 16, and a pair of suspending mechanisms T1, T2. The stationary bracket 23 suspends the movable bracket 24 (in other words, the upper jacket 16 connected to the movable bracket 24) via the suspending mechanisms T1, T2.

Figure 3:
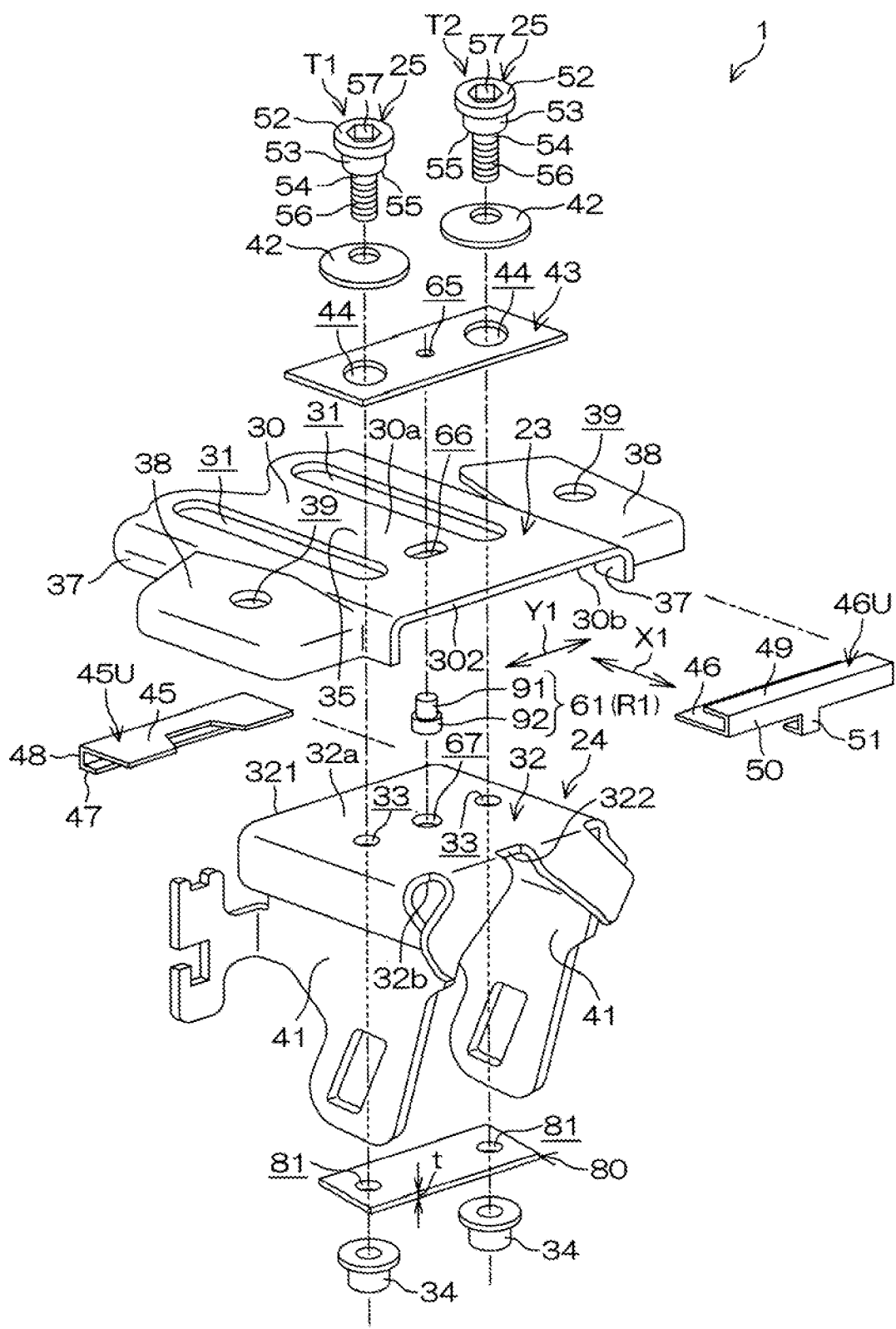
FIG. 3 is an exploded perspective view of the steering system in FIG. 1.

With reference to FIG. 3, for example, the stationary bracket 23, the movable bracket 24, and the suspending mechanisms T1, T2 will be described below. In The upper left side in FIG. 3 corresponds to the front side of the steering system 1, and the lower right side in FIG. 3 corresponds to the rear side of the steering system 1. The stationary bracket 23, which is also referred to as "upper bracket", is formed of, for example, a metal sheet. As illustrated in FIG. 3, the stationary bracket 23 has a first plate 30 that is parallel to both the prescribed direction X1 and the orthogonal direction Y1, a pair of side plates 37 extending downward respectively from a pair of side edges (outer edges in the orthogonal direction Y1) of the first plate 30, and a pair of attachment plates 38 extending outward (in the orthogonal direction Y1) respectively from the side plates 37. The attachment plates 38 are secured to the vehicle body-side member 13 (refer to FIG. 2) with securing bolts 40 (refer to FIG. 4) that are passed, from below, through screw insertion holes 39 formed in the attachment plates 38. In this way, the stationary bracket 23 is secured to the vehicle body-side member 13.

The movable bracket 24, which is also referred to as "tilt bracket", is formed of, for example, a metal sheet. The movable bracket 24 has a second plate 32 extending parallel to the first plate 30, and a pair of side plates 41 extending downward respectively from a pair of side edges (outer edges in the orthogonal direction Y1) of the second plate 32. The movable bracket 24 has a vertically-inverted U-shape. The movable bracket 24 is located immediately below the stationary bracket 23, and thus the second plate 32 of the movable bracket 24 is disposed so as to face the first plate 30 of the stationary bracket 23 from below. Connecting portions between the second plate 32 and the side plates 41 may each be formed in a curved shape that bulges outward in the orthogonal direction Y1 as illustrated in FIG. 3.

As illustrated in FIG. 1 and FIG. 2, the steering system 1 includes a lock mechanism 29. In response to an operation of an operating lever 27, the lock mechanism 29 fixes or unfixes, via the movable bracket 24, the position of the lock mechanism 29, the position of the upper jacket 16 and the position of the steering member 2 obtained after the telescopic adjustment or the tilt adjustment, using the fastening shaft 28.

The following description will be provided in association with the lock mechanism 29. As illustrated in FIG. 2, a column bracket 26 is secured to the upper jacket 16 of the steering column 15. The column bracket 26 has a U-shape, and has a pair of side plates 71 located between the side plates 41 of the movable bracket 24 and opposed to the respective side plates 41, and a connection plate 72 that connects lower ends of the side plates 71 to each other. The fastening shaft 28 is a bolt passed through the side plates 41 of the movable bracket 24 and the side plates 71 of the column bracket 26 in the orthogonal direction Y1. A nut 73 screwed to the fastening shaft 28 is rotated through a rotational operation of the operating lever 27 to fasten the side plates 41, 71 between the bolt head of the fastening shaft 28 and the nut 73, so that the side plates 41, 71 are locked. Thus, the position of the steering member 2 obtained after the telescopic adjustment or the tilt adjustment is fixed.

As illustrated in FIG. 3, elongated grooves 31 linearly extending along the prescribed direction X1 (the longitudinal direction) are formed in the first plate 30 of the stationary bracket 23 by pressing, punching, cutting or the like. Insertion holes 33 are formed in the second plate 32 of the movable bracket 24. The elongated grooves 31 and the insertion holes 33 are formed such that a set of one elongated groove 31 and one insertion hole 33 corresponds to the suspending mechanism T1, and another set of one elongated groove 31 and one insertion hole 33 corresponds to the suspending mechanism T2.

The elongated grooves 31 pass through the first plate 30 in its plate thickness direction, and are arranged parallel to each other and apart from each other in the orthogonal direction Y1. Corner portions at the ends of the elongated grooves 31 in the prescribed direction X1 are each rounded into a circular arc-shape. A boundary portion 35 that separates the elongated grooves 31 from each other is formed as part of the first plate 30. The boundary portion 35, which is part of the stationary bracket 23 and has a strip-shape, extends in the prescribed direction X1 between the elongated grooves 31. A first through-hole 66, which passes through the boundary portion 35 (first plate 30) in its plate thickness direction, is formed in one end portion (rear end portion) of the boundary portion 35 in the prescribed direction X1. The distances between the first through-hole 66 and the elongated grooves 31 are equal to each other in the orthogonal direction Y1.

The insertion holes 33 are circular holes that pass through the second plate 32 in its plate thickness direction, are arranged so as to be apart from each other in the orthogonal direction Y1, and are opposed, from below, to parts of the elongated grooves 31, which are located at the same positions as the insertion holes 33 in the orthogonal direction Y1. That is, the insertion holes 33 are opposed respectively to the elongated grooves 31. A second through-hole 67, which passes through the second plate 32 in its plate thickness direction, is formed in the second plate 32 at a position between the insertion holes 33 in the orthogonal direction Y1. The distances between the second through-hole 67 and the insertion holes 33 in the orthogonal direction Y1 are equal to each other. The first through-hole 66 and the second through-hole 67 are holes through which a pin 61 is passed as described later in detail.

At normal times other than a secondary collision, the insertion holes 33 of the movable bracket 24 are opposed respectively to one end portions (rear end portions) of the elongated grooves 31 of the stationary bracket 23 (refer to FIG. 1). Each of the suspending mechanisms T1, T2 includes, for example, a suspending member 25, a leaf spring 42 such as a coned disc spring, a nut 34, a slide plate 43, and an under plate 80. A pair of the suspending members 25 (two suspending members 25), a pair of the leaf springs 42 (two leaf springs 42) and a pair of the nuts 34 (two nuts 34) are provided so that each of the suspending mechanisms T1, T2 includes one suspending member 25, one leaf spring 42, and one nut 34. The suspending member 25, the leaf spring 42 and the nut 34 in each of the suspending mechanisms T1, T2 are aligned in the orthogonal direction Y1.

Each of the suspending members 25 is a bolt extending in the up-down direction and having a head 52 at its upper end. The suspending members 25 are respectively passed through the rear end portions of the elongated grooves 31 of the first plate 30 and the insertion holes 33 of the second plate 32, which are opposed to the rear end portion of the elongated grooves 31. Lower end portions of the suspending members 25 are screwed to the nuts 34. Thus, the suspending members 25 connect the first plate 30 and the second plate 32 to each other, in cooperation with the nuts 34, thereby suspending the movable bracket 24 (in other words, the column bracket 26 and the upper jacket 16) from the stationary bracket 23 (refer to FIG. 2).

As illustrated in FIG. 1, at the time of a secondary collision, the suspending members 25 is allowed to move forward in the prescribed direction X1 along the elongated grooves 31, together with the movable bracket 24, the column bracket 26, the upper jacket 16, the upper shaft 11 and the steering member 2 (these components will be hereinafter referred to as "movable members"). At this time, the elongated grooves 31 guide the movement of the suspending members 25 at the time of the secondary collision. At this time, the movable bracket 24 is moved forward relative to the stationary bracket 23 in the prescribed direction X1, together with the steering member 2. The housing 18 of the steering column 15 may be removed from the lower bracket 59 on the vehicle body-side as needed in order to allow the suspending members 25 and the movable members to move smoothly.

The slide plate 43 is formed of a thin plate that is elongated in the orthogonal direction Y1, and is interposed between the leaf springs 42 and an upper face 30a of the first plate 30, as illustrated in FIG. 2. A low friction material such as fluororesin or tetrafluoroethylene resin is applied to at least a first plate 30-side face (lower face) of the slide plate 43. In this case, the entirety of the slide plate 43 may be made of the low friction material. Alternatively, the first plate 30-side face of the slide plate 43 may be covered with the low friction material. Insertion holes 44 (two in total) that pass through the slide plate 43 in its plate thickness direction are formed in the slide plate 43 at positions respectively opposed to the insertion holes 33 of the movable bracket 24 (the same positions as the insertion holes 33 in the orthogonal direction Y1).

The under plate 80 is formed of a thin plate that is elongated in the orthogonal direction Y1, and is attached, from below, to the second plate 32 of the movable bracket 24 as illustrated in FIG. 2 (refer to also FIG. 3). In this state, the thickness direction (up-down direction) of the under plate 80 coincides with the thickness direction of the second plate 32. Second insertion holes 81 (two in total) that pass through the under plate 80 in its plate thickness direction are formed in the under plate 80 at positions respectively opposed to the insertion holes 33 of the movable bracket 24 (the same positions as the insertion holes 33 in the orthogonal direction Y1). The two second insertion holes 81 are aligned in the orthogonal direction Y1. A portion of the under plate 80 between the two second insertion holes 81 completely closes, from below, the second through-hole 67 of the second plate 32 of the movable bracket 24.

Each of the suspending members 25 is passed through the corresponding annular leaf spring 42, the corresponding insertion hole 44 of the slide plate 43 (the insertion hole 44 being at the same position as the leaf spring 42 in the orthogonal direction Y1), the corresponding elongated groove 31 of the first plate 30, the corresponding insertion hole 33 of the second plate 32 and the corresponding second insertion holes 81 of the under plate 80 in this order, and is screwed to the nut 34 disposed below the under plate 80. In this way, the movable bracket 24 and the under plate 80 are suspended by the suspending members 25. At the time of a secondary collision, the slide plate 43 slides relative to the stationary bracket 23 to move together with the suspending members 25, and the under plate 80 moves together with the movable members (for example, the movable bracket 24), the suspending member 25 and the slide plate 43.

A first intervening plate 45 and a second intervening plate 46 that function to reduce a sliding resistance when the second plate 32 is moved forward relative to the first plate 30 upon a secondary collision, are interposed between the first plate 30 and the second plate 32. As illustrated in FIG. 3, the first intervening plate 45 constitutes a groove-shaped unit 45U engaged with a first end portion 321 that is one end portion (front end portion) of the second plate 32 in the prescribed direction X1. That is, the unit 45U has the first intervening plate 45 extending along an upper face 32a of the second plate 32 and a lower face 30b of the first plate 30, an opposed plate 47 opposed to the first intervening plate 45 and extending along a lower face 32b of the second plate 32, and a connection plate 48 that connects the first intervening plate 45 and the opposed plate 47 to each other and that abuts against one end edge (front end edge) of the second plate 32 in the prescribed direction X1.

At least the first plate 30-side face (upper face illustrated in FIG. 3) of the first intervening plate 45 is made of the above-described low friction material. The first intervening plate 45 or the unit 45U itself may be entirely made of the low friction material, or the first plate 30-side face of the first intervening plate 45 may be coated with the low friction material. The second intervening plate 46 constitutes a unit 46U that is engaged with both a second end portion 302 that is the other end portion (rear end portion) of the first plate 30 in the prescribed direction X1, and a second end portion 322 that is an end portion (rear end portion) of the second plate 32 in the prescribed direction X1. That is, the unit 46U has the second intervening plate 46 extending along the upper face 32a of the second plate 32 and the lower face 30b of the first plate 30, and an opposed plate 49 opposed to the second intervening plate 46 and extending along the upper face 30a of the first plate 30.

The unit 46U has a connection plate 50 that connects the second intervening plate 46 and the opposed plate 49 to each other and that abuts against the other end edge (rear end edge) of the first plate 30 in the prescribed direction X1, and an engagement portion 51 having a hook-shape and engaged with the second end portion 322 of the second plate 32.

At least the second plate 32-side face (lower face in FIG. 3) of the second intervening plate 46 is made of the above-described low friction material. The second intervening plate 46 or the unit 46U itself may be made of the low friction material, or the second plate 32-side face of the second intervening plate 46 may be covered with the low friction material. The first intervening plate 45 and the second intervening plate 46 are not overlapped with any of the elongated grooves 31 and the first through-hole 66 of the first plate 30 and the insertion holes 33 and the second through-hole 67 of the second plate 32.

The suspending members 25 will be described below. Each of the suspending members 25 has the head 52 having a flange-shape, a large-diameter portion 53 continuous with the head 52 and having a diameter smaller than that of the head 52, a small-diameter portion 54 continuous with the large-diameter portion 53 and having a diameter smaller than that of the large-diameter portion 53, a step portion 55 formed between the large-diameter portion 53 and the small-diameter portion 54, and a threaded portion 56 formed in the small-diameter portion 54. A tool-engaged portion 57 such as a hexagonal hole is formed in the head 52.

At normal times other than a secondary collision, as illustrated in FIG. 2, the head 52 of each suspending member 25 is engaged with the corresponding leaf spring 42 from above while being opposed, from above, to the edge of the rear end portion of the corresponding elongated groove 31 of the stationary bracket 23. The large-diameter portion 53 of each suspending member 25 is passed, from above, through a hollow portion of the leaf spring 42, the insertion hole 44 of the slide plate 43 and the rear end portion of the elongated groove 31. Thus, the slide plate 43 is interposed between the heads 52 of the suspending members 25 and the stationary bracket 23 (edges of the elongated grooves 31). The step portions 55 abut against the upper face 32a of the second plate 32, and are received by the upper face 32a. The second plate 32 and the under plate 80 are held between the step portions 55 and the nuts 34, so that the suspending members 25, the second plate 32 and the under plate 80 are fastened together.

A distance H1 between the head 52 and the step portion 55 (corresponding to the axial length of the large-diameter portion 53) is set slightly larger than the sum of the plate thickness of the first intervening plate 45 interposed between the first plate 30 and the second plate 32 (or the plate thickness of the second intervening plate 46), the plate thickness of the first plate 30, the plate thickness of the slide plate 43 extending along the upper face 30a of the first plate 30 and the plate thickness of the leaf spring 42 compressed to the fullest extent. Thus, the leaf spring 42 elastically urges the first plate 30 toward the second plate 32 via the slide plate 43.

Figure 4:
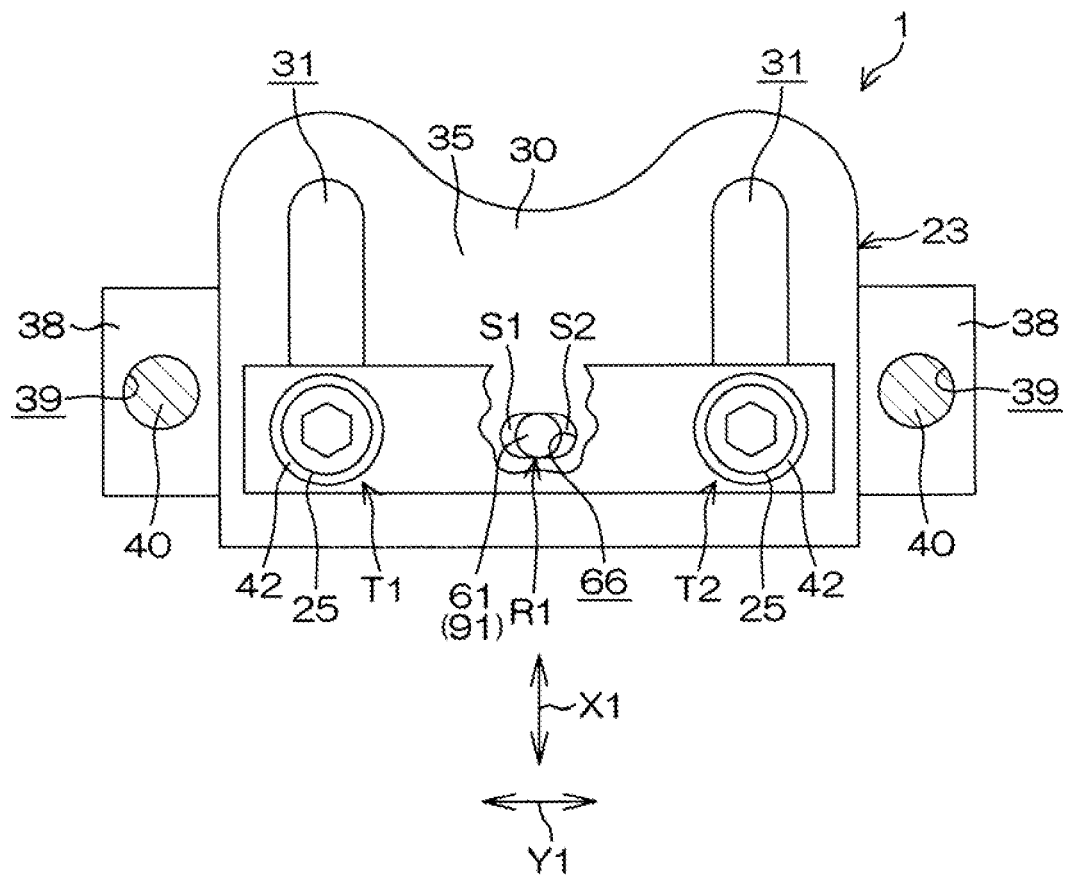
FIG. 4 is a partially broken schematic plan view illustrating a stationary bracket, a pair of suspending mechanisms and a connection-disconnection mechanism.

At normal times as described above, each of the suspending members 25 is located at the rear end portion of the corresponding elongated groove 31 (refer to FIG. 4). The position of the second plate 32 of the movable bracket 24 in the prescribed direction X1 in this state is the initial position (refer to FIG. 1, FIG. 2 and FIG. 5). The steering system 1 includes a connection-disconnection mechanism R1 that connects the first plate 30 of the stationary bracket 23 and the second plate 32 of the movable bracket 24 to each other at normal times, and that disconnects, at the time of a secondary collision, the second plate 32 from the first plate 30 to move the second plate 32 relative to the first plate 30 from the initial position (refer to FIG. 5) forward in the prescribed direction X1 as illustrated in FIG. 6.

As illustrated in FIG. 2 and FIG. 4 that is a partially broken schematic plan view, the connection-disconnection mechanism R1 is disposed between the suspending mechanisms T1, T2 in the orthogonal direction Y1 (that is, between the elongated grooves of the first plate 30 of the stationary bracket 23). Specifically, the connection-disconnection mechanism R1 is located at the middle position between the elongated grooves 31 (that is, between the suspending member 25) in the orthogonal direction Y1. The connection-disconnection mechanism R1 is formed of a resin pin 61 that breaks due to shearing at the time of a secondary collision.

Figure 5:
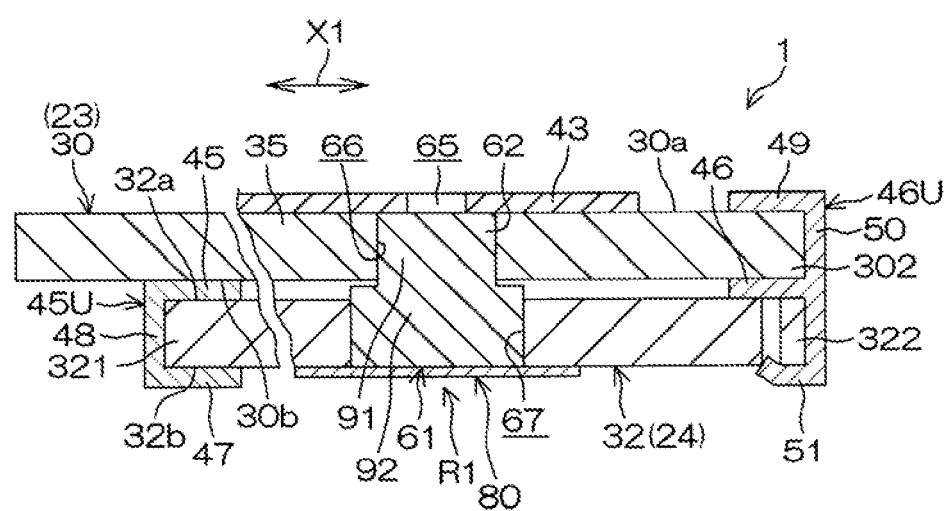
FIG. 5 is a sectional view illustrating the state where a first plate of the stationary bracket and a second plate of a movable bracket are connected to each other, and illustrating a section taken along the longitudinal direction including the axis of a pin.
Figure 6:
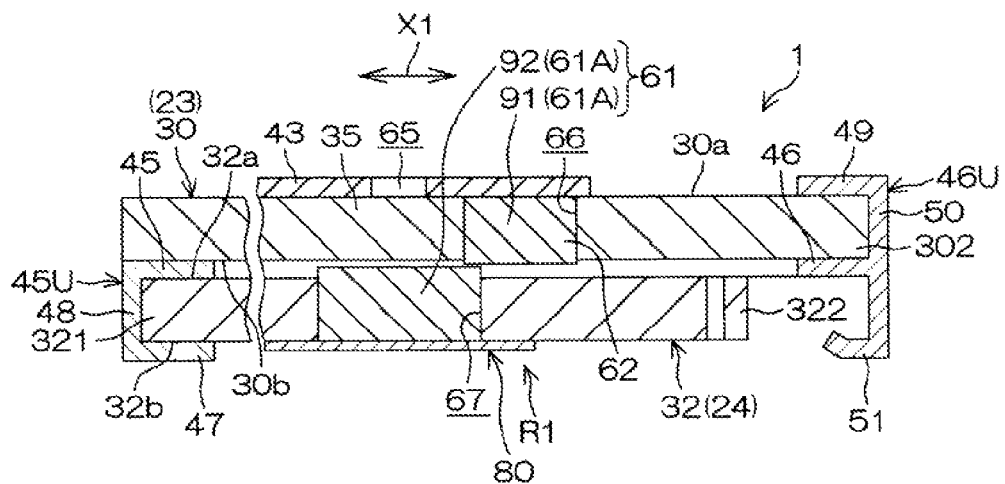
FIG. 6 is a sectional view illustrating the first plate and the second plate at the time of a secondary collision, and illustrating the state where the second plate is removed from the first plate and moved in a prescribed direction from the state in FIG. 5 due to shear of the pin.

As illustrated in FIG. 5, the pin 61 of the connection-disconnection mechanism R1 is a single-piece member that has a first shaft portion 91 having, for example, a columnar shape, and a second shaft portion 92 continuous, from below, with the first shaft portion 91 and having a columnar shape with a diameter larger than that of the first shaft portion 91. Thus, the pin 61 has, as a whole, a sectional shape with one step, which becomes narrower in a stepwise manner in the upward direction. At normal times as described above, the first through-hole 66 of the first plate 30 of the stationary bracket 23 and the second through-hole 67 of the second plate 32 of the movable bracket 24 are located at the same position in both the prescribed direction X1 and the orthogonal direction Y1, and thus the first through-hole 66 and the second through-hole 67 are opposed to each other in the up-down direction. At this time, most of the first shaft portion 91 of the pin 61 is inserted, from below, through the first through-hole 66 of the first plate 30 of the stationary bracket 23. Most of the second shaft portion 92 of the pin 61 is inserted, from above, through the second through-hole 67 of the second plate 32 of the movable bracket 24. A lower end portion of the first shaft portion 91 and an upper end portion of the second shaft portion 92 are exposed on the outside of the first through-hole 66 and the second through-hole 67, respectively, and are located between the first plate 30 and the second plate 32. Thus, the pin 61 is passed through both the first through-hole 66 and the second through-hole 67 that are opposed to each other. In this way, the pin 61 positions the movable bracket 24 with respect to the stationary bracket 23.

In this state, by disposing the slide plate 43 to cover the first shaft portion 91 of the pin 61 from above, the pin 61 is prevented from coming out of the first through-hole 66 in the upward direction. An inspection hole 65 having a diameter smaller than the outer diameter of the first shaft portion 91 of the pin 61 is formed in the slide plate 43 so as to be opposed to the first shaft portion 91. After the assembly of the connection-disconnection mechanism R1, the first shaft portion 91 of the pin 61 is visually checked through the inspection hole 65 of the slide plate 43, so that it is possible to easily check whether there is an error at the assembly work, for example, whether a worker forgets to fit the pin 61 to the first plate 30 and the second plate 32.

Figure 7:
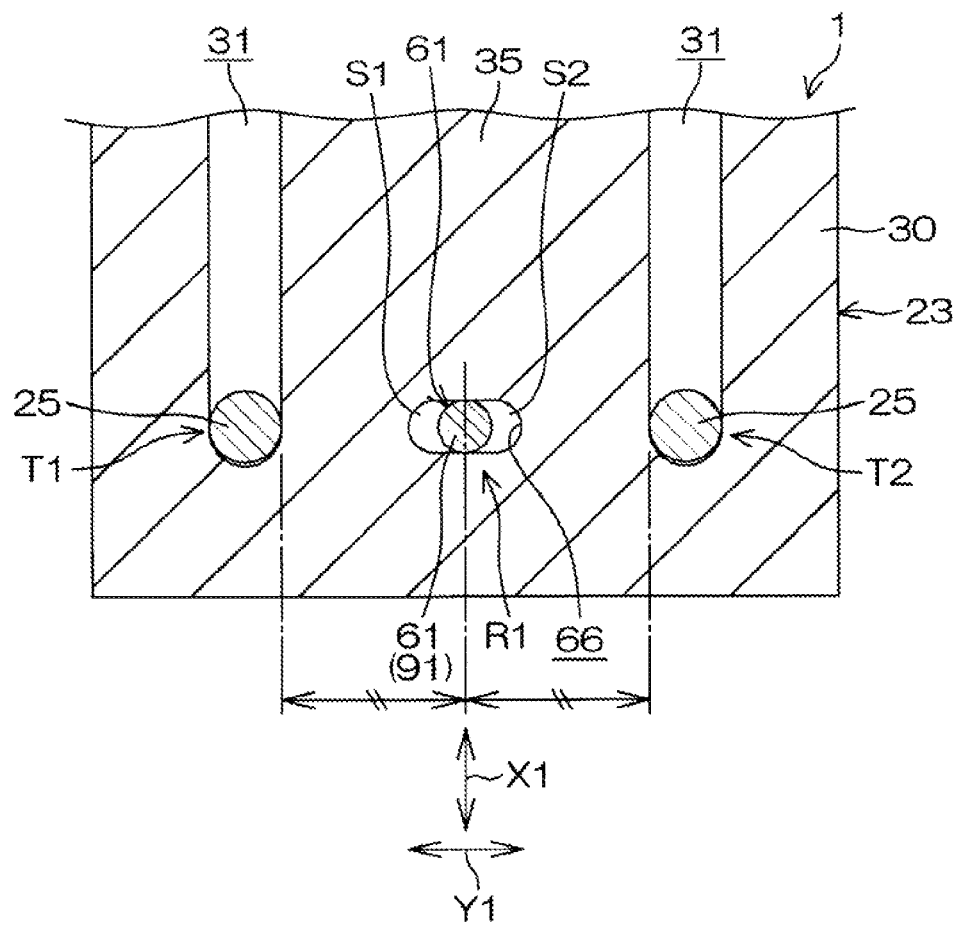
FIG. 7 is a sectional view taken along the line VII-VII in FIG. 2, illustrating a section of the first plate and the connection-disconnection mechanism.

By completely closing, from below, the second through-hole 67 of the second plate 32 with the use of the under plate 80 attached to the lower face 32b of the second plate 32 from below, the pin 61 (the second shaft portion 92) fitted in the second through-hole 67 is supported from below by the under plate 80. Thus, it is possible to prevent the pin 61 from coming out of the second through-hole 67 in the downward direction. As illustrated in FIG. 7 that is a sectional view taken along the line VII-VII in FIG. 2, the single first through-hole 66 of the first plate 30 is formed at the middle position between the elongated grooves 31 for the suspending mechanisms T1, T2 in the orthogonal direction Y1. That is, the pin 61 is located at the middle position between the suspending mechanisms T1, T2 in the orthogonal direction Y1.

Figure 8:
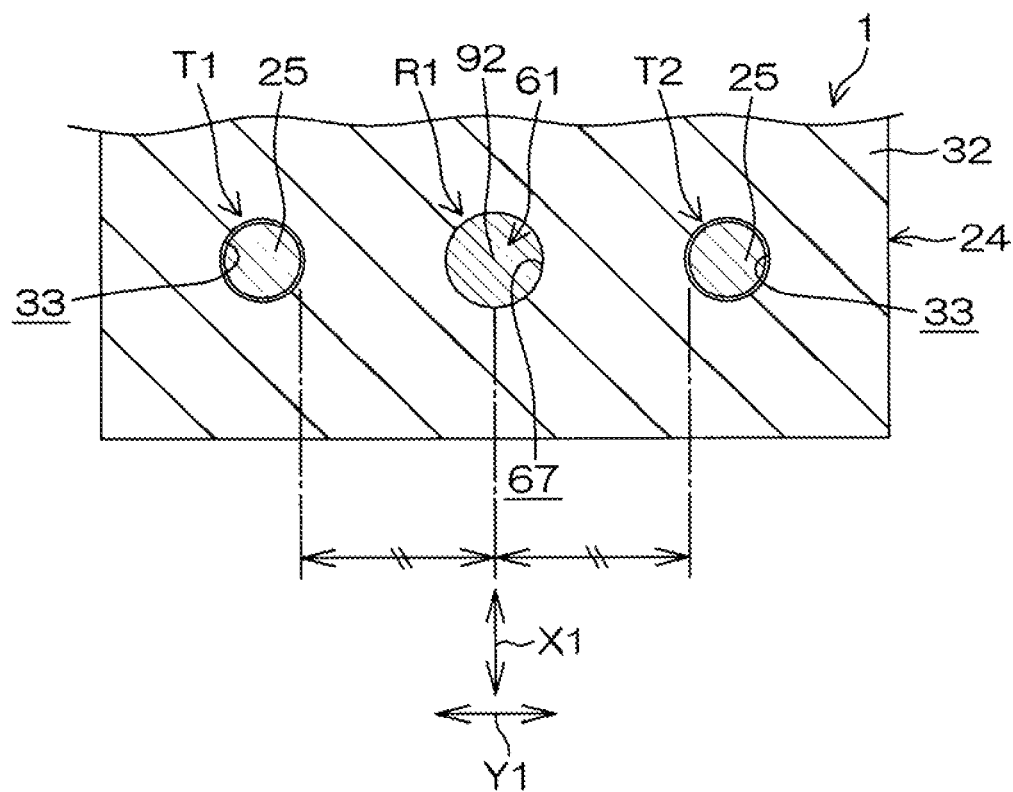
FIG. 8 is a sectional view taken along the line VIII-VIII in FIG. 2, illustrating a section of the second plate and the connection-disconnection mechanism.

The first through-hole 66 of the first plate 30 is a laterally-long hole that is elongated in the orthogonal direction Y1. Thus, gaps S1, S2 are defined between the outer periphery of the first shaft portion 91 of the pin 61 and the inner periphery of the first plate 30, which defines the first through-hole 66, in the orthogonal direction Y1. As illustrated in FIG. 8 that is a sectional view taken along the line VIII-VIII in FIG. 2, the single second through-hole 67 of the second plate 32 of the movable bracket 24 is formed at the middle position between the insertion holes 33 in the orthogonal direction Y1. The second through-hole 67 is a circular hole having a diameter that is equal to or slightly larger than the outer diameter of the second shaft portion 92 of the pin 61.

At the time of a secondary collision, as illustrated in FIG. 6, the first through-hole 66 and the second through-hole 67 are offset from each other. Thus, the boundary between the first shaft portion 91 and the second shaft portion 92 in the pin 61 is sheared at a position between the first through-hole 66 and the second through-hole 67. A shearing edge formed of the edge of the first through-hole 66 of the first plate 30 extends linearly in the orthogonal direction Y1 (refer to FIG. 7), and a shearing edge formed of the edge of the second through-hole 67 of the second plate 32 has a circular arc-shape (refer to FIG. 8).

At the time of a secondary collision, the pin 61 breaks, and thus the movable bracket 24 is removed from the stationary bracket 23. As described above, the movable bracket 24 is moved forward in the prescribed direction X1 from the initial position (refer to FIG. 5), as illustrated in FIG. 6. That is, at the time of a secondary collision, the pin 61 breaks at a position between the first through-hole 66 and the second through-hole 67 that are offset from each other, thereby allowing the movable bracket 24 to move relative to the stationary bracket 23 in the prescribed direction X1. Thus, an impact caused by the secondary collision is absorbed. The magnitude of a sear load at which the pin 61 breaks, that is, the magnitude of a load at which the movable bracket 24 is removed from the stationary bracket 23 is adjustable on the basis of the sectional area of the pin 61.

As described above, in the steering system 1, the pin 61 passed through both the first through-hole 66 and the second through-hole 67 breaks at the time of a secondary collision, and thus the movable bracket 24 moves relative to the stationary bracket 23, so that an impact caused by the secondary collision is absorbed. Even though the pin 61 breaks into fragments 61A at the time of a secondary collision, the fragment 61A in the second through-hole 67 is supported by the under plate 80 from below. Therefore, even after the secondary collision, at least the fragment 61A in the second through-hole 67 remains in the second through-hole 67 without dropping therefrom. In particular, at the time of a secondary collision, the under plate 80 moves together with the movable bracket 24, and thus the second through-hole 67 of the movable bracket 24 during movement is always closed from below by the under plate 80. Thus, it is possible to reliably prevent the fragment 61A of the pin 61 from dropping from the second through-hole 67. Further, the boundary portion 35 of the stationary bracket 23 is always located above the second through-hole 67 that is offset from the first through-hole 66 to close the second through-hole 67 from above. Thus, the fragment 61A of the pin 61 in the second through-hole 67 is prevented from coming out of the second through-hole 67 in the upward direction.

When the steering system 1 is disassembled after a secondary collision, if the presence of the fragment 61A of the pin 61 in the second through-hole 67 is confirmed, it is determined that the pin 61 breaks at the time of the secondary collision, that is, the impact absorbing function of the steering system 1 is fulfilled properly. On the other hand, if the fragment 61A of the pin 61 is not found in the second through-hole 67 after the secondary collision, it is determined that a worker forgets to set the pin 61 in the first through-hole 66 and the second through-hole 67 during the assembly of the steering system 1 and therefore no pin 61 is present in the steering system 1 from the beginning By checking the presence or absence of the fragment 61A of the pin 61 in the second through-hole 67, it is possible to clearly determine whether the impact absorbing function of the steering system 1 is properly fulfilled due to breakage of the pin 61 at the time of a secondary collision or not.

The movable bracket 24 of which the apparent plate thickness is increased by the under plate 80 attached to the movable bracket 24 is reinforced by the under plate 80. Thus, it is possible to enhance the stiffness of the movable bracket 24 (in other words, the entirety of the steering system 1). Due to the enhancement of the stiffness, vibrations of the steering system 1 are suppressed, so that it is possible to inhibit the vibrations of the steering system 1 from being transmitted to a driver who operates the steering member 2. From a viewpoint of the enhancement of the stiffness of the movable bracket 24, it is preferable that a plate thickness t (refer to FIG. 3) of the under plate 80 be as large as possible. However, in view of deterioration in the assembly efficiency due to an increase in the length of the suspending bolts, availability of materials (SPHC material or SPCC material), reduction in costs for steel materials and reduction in weight of the vehicle body, it is necessary to set the plate thickness t to a value equal to or less than a prescribed value. Further, because the under plate 80 serves as a reinforcement, it is desirable to set the plate thickness t of the under plate 80 to a value equal to or less than the plate thickness of the second plate 32 of the movable bracket 24. For example, the plate thickness t is preferably set to a value within a range from 2 mm to 3.2 mm. In the present embodiment, the plate thickness t is set to 2.6 mm.

As illustrated in FIG. 3, the paired elongated grooves 31, the paired insertion holes 33, the paired suspending members 25 and the paired second insertion holes 81 are respectively aligned in the orthogonal direction Y1 that is orthogonal to the prescribed direction X1. Thus, at the time of a secondary collision, the movable bracket 24 is moved in the prescribed direction X1, in a posture stable along the orthogonal direction Y1. Thus, an impact caused by the secondary collision is stably absorbed.

Figure 9:
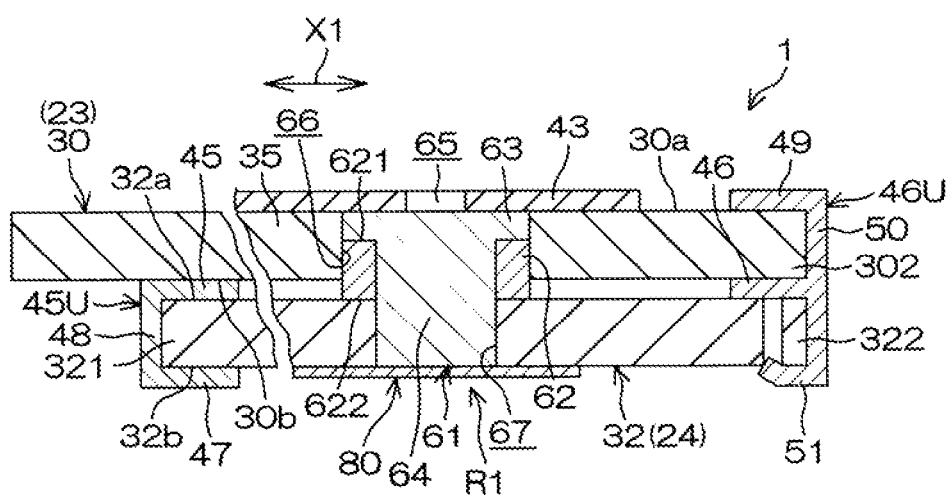
FIG. 9 is a view illustrating a modified example and corresponding to FIG. 5.

The invention is not limited to the embodiment described above, that is, various modifications may be made to the embodiment described above. For example, the under plate 80 is a component independent from the movable bracket 24 in the above-described embodiment. Alternatively, the under plate 80 may be formed integrally with the movable bracket 24. In a modified example, the connection-disconnection mechanism R1 may be formed of the pin 61, and a cylindrical metal collar 62 fitted in an axial part of the pin 61 as illustrated in FIG. 9. Instead of the metal collar 62, a collar made of high hardness resin, ceramic or the like may be used.

The pin 61 of the connection-disconnection mechanism R1 in the modified example has a head 63 having, for example, a circular sectional shape, and a columnar shaft portion 64 having a diameter smaller than that of the head 63. The cylindrical metal collar 62 is fitted to the outer periphery of the shaft portion 64. The metal collar 62 has an outer diameter that is equal to that of the head 63 of the pin 61. As described above, at normal times, the first through-hole 66 of the first plate 30 of the stationary bracket 23 and the second through-hole 67 of the second plate 32 of the movable bracket 24 are opposed to each other in the up-down direction. At this time, the head 63 of the pin 61 and most of the metal collar 62 are both inserted through the first through-hole 66 of the first plate 30 of the stationary bracket 23. Part of the metal collar 62 is exposed on the outside of the first through-hole 66. A portion of the shaft portion 64 of the pin 61, which is protruded from the metal collar 62, is inserted through the second through-hole 67 of the second plate 32 of the movable bracket 24. That is, the pin 61 is inserted through both the first through-hole 66 and the second through-hole 67 that are opposed to each other. Thus, the pin 61 positions the movable bracket 24 with respect to the stationary bracket 23.

The metal collar 62 has a first axial end portion 621 (upper end portion in FIG. 9) that abuts against the head 63 of the pin 61, and a second axial end portion 622 (lower end portion in FIG. 9) supported by the upper face 32a of the second plate 32. Thus, it is possible to prevent the pin 61 and the metal collar 62 from dropping downward from the second plate 32. Further, because the slide plate 43 is disposed to cover the head 63 of the pin 61 from above, the pin 61 is prevented from coming out of the first through-hole 66 in the upward direction. After the assembly of the connection-disconnection mechanism R1, the head 63 of the pin 61 is visually checked through the inspection hole 65 of the slide plate 43, so that it is possible to easily check whether there is an error at the assembly work, for example, whether a worker forgets to fit the pin 61 to the first plate 30 and the second plate 32.

Figure 10:
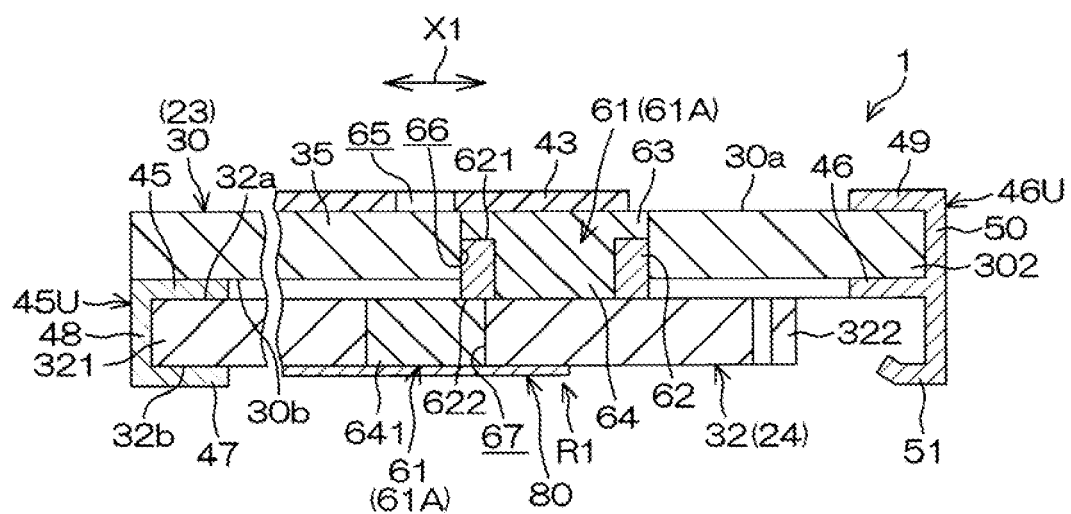
FIG. 10 is a view illustrating the modified example and corresponding to FIG. 6.

As in the embodiment described above, because the under plate 80 attached to the lower face 32b of the second plate 32 from below completely closes the second through-hole 67 of the second plate 32, the pin 61 (the shaft portion 64) in the second through-hole 67 is supported from below by the under plate 80. Thus, it is possible to prevent the pin 61 from dropping downward from the second through-hole 67. At the time of a secondary collision, as illustrated in FIG. 10, the first through-hole 66 and the second through-hole 67 are offset from each other. Thus, the mating face of the second axial end portion 622 of the metal collar 62 and the mating face of the second plate 32 are offset from each other. As a result, the shaft portion 64 of the pin 61 is sheared at a position between the first through-hole 66 and the second through-hole 67. A shearing edge formed of an inner peripheral edge of the second axial end portion 622 of the metal collar 62 has a circular arc-shape, and a shearing edge formed of an edge of the second through-hole 67 of the second plate 32 also has a circular arch-shape.

At the time of a secondary collision, the movable bracket 24 is removed from the stationary bracket 23 as the pin 61 breaks, and, as described above and as illustrated in FIG. 10, the movable bracket 24 moves forward in the prescribed direction X1 from the initial position (refer to FIG. 9). That is, in this modified example as well, at the time of a secondary collision, the pin 61 breaks at a position between the first through-hole 66 and the shaft portion 64 that are offset from each other, thereby allowing the movable bracket 24 to move relative to the stationary bracket 23 in the prescribed direction X1.

In the modified embodiment as well, because the second through-hole 67 of the movable bracket 24 is closed by the under plate 80 from below, the fragment 61A of the pin 61 remains in the second through-hole 67 even after a secondary collision. If the metal collar 62 is press-fitted in the first through-hole 66, the fragment 61A of the pin 61 remains in the first through-hole 66 after a secondary collision. The number of the pins 61 may be two or more, and the number of the first through-holes 66 and the number of the second through-holes 67 may be changed as needed depending on the number of the pins 61.

What is claimed is:

1. A steering system comprising:
   a stationary bracket having an elongated groove extending in a prescribed direction and a first through-hole, and secured to a vehicle body;
   a movable bracket having an insertion hole opposed to the elongated groove and a second through-hole, the movable bracket being movable relative to the stationary bracket in the prescribed direction together with a steering member at a time of a secondary collision;
   a suspending member passed through the elongated groove and the insertion hole that are opposed to each other to suspend the movable bracket from the stationary bracket, the suspending member being movable along the elongated groove together with the movable bracket at the time of the secondary collision;
   a pin that is passed through both the first through-hole and the second through-hole that are opposed to each other, and that breaks at a position between the first through-hole and the second through-hole that are offset from each other at the time of the secondary collision to allow the movable bracket to move relative to the stationary bracket in the prescribed direction; and
   an under plate attached to the movable bracket so as to close the second through-hole from below.

2. The steering system according to claim 1 wherein:
   a second insertion hole through which the suspending member is passed is formed in the under plate at a position opposed to the insertion hole of the movable bracket; and
   the under plate is movable together with the movable bracket and the suspending member at the time of the secondary collision.

3. The steering system according to claim 1, wherein the steering system has a pair of the elongated grooves aligned in an orthogonal direction orthogonal to the prescribed direction, a pair of the insertion holes aligned in the orthogonal direction, and a pair of the suspending members aligned in the orthogonal direction.

4. The steering system according to claim 2, wherein the steering system has a pair of the elongated grooves aligned in an orthogonal direction that is orthogonal to the prescribed direction, a pair of the insertion holes aligned in the orthogonal direction, a pair of the suspending members aligned in the orthogonal direction, and a pair of the second insertion holes aligned in the orthogonal direction.

5. The steering system according to claim 1 wherein the under plate has a thickness equal to or less than a thickness of the movable bracket

* * * * *